United States Patent
Benner et al.

(10) Patent No.: US 9,054,797 B2
(45) Date of Patent: *Jun. 9, 2015

(54) TESTING AN OPTICAL NETWORK (71) Applicant: International Business Machines Corporation, Armonk, NY (US)

(72) Inventors: Alan F. Benner, Poughkeepsie, NY (US); Richard B. Finch, New Paltz, NY (US); Jason Thomas Hirst, Poughkeepsie, NY (US); Peter Paul Lai, Rochester, MN (US); Gerald Glen Stanquist, Salt Point, NY (US)

(73) Assignee: International Business Machines Corporation, Armonk, NY (US)

( * ) Notice: Subject to any disclaimer, the term of this patent is extended or adjusted under 35 U.S.C. 154(b) by 107 days.

This patent is subject to a terminal disclaimer.

(21) Appl. No.: 13/779,531

(22) Filed: Feb. 27, 2013

(65) Prior Publication Data
US 2014/0186031 A1 Jul. 3, 2014

Related U.S. Application Data (63) Continuation of application No. 13/733,801, filed on Jan. 3, 2013.

(51) Int. Cl.
*H04B 10/079* (2013.01)
*H04B 10/073* (2013.01)
*H04B 10/07* (2013.01)

(52) U.S. Cl.
CPC ............. *H04B 10/073* (2013.01); *H04B 10/07* (2013.01)

(58) Field of Classification Search
CPC .................. H04B 10/07955; H04B 10/0791

USPC ................ 398/25, 38, 151, 13, 20–21, 28–29
See application file for complete search history.

(56) References Cited

U.S. PATENT DOCUMENTS

| | | | |
|---|---|---|---|
| 6,064,501 A * | 5/2000 | Roberts et al. | 398/11 |
| 6,304,347 B1 | 10/2001 | Beine et al. | |
| 6,317,231 B1 | 11/2001 | Al-Salameh et al. | |
| 7,113,267 B1 | 9/2006 | Suzuki et al. | |
| 7,945,158 B2 * | 5/2011 | Leonov et al. | 398/25 |
| 8,417,114 B1 * | 4/2013 | Storey et al. | 398/16 |
| 8,594,500 B2 * | 11/2013 | Xia et al. | 398/38 |

(Continued)

OTHER PUBLICATIONS

Siegl, W.-et al.; "Continuity Test for Ladder Networks"; http://www.ip.com/pubview/IPCOM000095837D; Mar. 7, 2005.

(Continued)

*Primary Examiner* — Leslie Pascal
(74) *Attorney, Agent, or Firm* — Kunzler Law Group (57) ABSTRACT

A method for testing an optical network is disclosed. The method includes transmitting a first optical power level on a first optical port of an optical assembly, where the optical assembly includes the first optical port, an optical cable and/or an optical waveguide, and a second optical port. The optical assembly is installed in an assembled computer and the assembled computer is in a state suitable for an end user. The method includes measuring a second optical power level at the second optical port and determining a quality level by determining if the second optical power level is below a quality threshold value. The transmitting, the measuring, and the determining occur within the assembled computer. An apparatus and computer program product also perform the functions of the method.

13 Claims, 8 Drawing Sheets

(56) References Cited

U.S. PATENT DOCUMENTS

| | | | |
|---|---|---|---|
| 2010/0215360 A1* | 8/2010 | Weng et al. | 398/23 |
| 2011/0110662 A1 | 5/2011 | Wellbrock et al. | |
| 2012/0230684 A1* | 9/2012 | Effenberger et al. | 398/38 |
| 2012/0243866 A1* | 9/2012 | Noble et al. | 398/25 |

OTHER PUBLICATIONS

Feng, JS.-et al.; "Continuity Testing Circuitry"; http://www.ip.com/pubview/IPCOM000056295D; Feb. 14, 2005.

* cited by examiner

TESTING AN OPTICAL NETWORK

CROSS-REFERENCE TO RELATED APPLICATIONS

This application is a continuation U.S. patent application Ser. No. 13/733,801 entitled "METHOD AND APPARATUS FOR TESTING AN OPTICAL NETWORK" and filed on Jan. 3, 2013 for Alan F Benner, et al. the entire contents of the above mentioned application is incorporated herein by reference for all purposes.

BACKGROUND

1. Field

The subject matter disclosed herein relates to testing an optical network and more particularly relates to verifying continuity and determining the connection quality of optical assemblies.

2. Description of the Related Art

High performance computers, or supercomputers, often contain optical networks to communicate between processor nodes in the computer assembly. It is desirous to quickly manufacture such computers with high reliability. Optical networks need to be efficiently tested and verified before such a computer assembly may be delivered to an end user. Optical networks may be very complicated and may require a concise and automated testing procedure. Testing an optical network is typically done by transmitting and receiving a variety of digital patterns on the optical network, or otherwise exercising the optical network digitally. Failures are typically identified when received patterns differ from transmitted patterns, or transmitted patterns are not received at all.

BRIEF SUMMARY

An apparatus is disclosed that includes a transmission module that transmits a first optical power level on a first optical port of an optical assembly. The optical assembly includes the first optical port, an optical cable and/or an optical waveguide, and a second optical port. The optical assembly is installed in an assembled computer and the assembled computer is in a state suitable for an end user. The apparatus includes a measurement module that measures a second optical power level at the second optical port, and a determination module that determines a quality level by determining if the second optical power level is below a quality threshold value. The transmission module, the measurement module, and the determination module function within the assembled computer.

In one embodiment, the transmission module transmits on a plurality of optical assemblies, the measurement module measures a plurality of second optical power levels on the plurality of optical assemblies, and the determination module determines a plurality of quality levels by determining a quality level of each optical assembly. In another embodiment, the apparatus includes a connection block, where a plurality of optical assemblies terminates at one or more connection blocks. In a further embodiment, the determination module determines a connection state of a connection block based on a fail pattern of the plurality of quality levels of the optical assemblies terminating at the connection block. In another embodiment, the determination module determines the plurality of quality levels based on one or more pre-determined threshold ranges, where each pre-determined threshold range includes a quality threshold value.

In one embodiment, that apparatus includes a display module that displays the plurality of quality levels. In another embodiment, the display module displays the plurality of quality levels in an array, where respective quality levels are displayed in an element of the array. In another embodiment, each element of the array includes a quality level of a plurality of possible quality levels. In another embodiment, the display module displays the plurality of quality levels via a bitmap. In another embodiment, the display module displays the plurality of quality levels for a plurality of connection blocks. Each connection block includes a plurality of optical assemblies terminating at the connection block.

In one embodiment, the plurality of optical assembles comprises an optical backplane. In a further embodiment, the assembled computer includes a plurality of optical backplanes. In another embodiment, the measurement module measures the second optical power level at the second optical port as an analog measurement.

Also a method for testing an optical network is disclosed. The method includes transmitting a first optical power level on a first optical port of an optical assembly, where the optical assembly includes the first optical port, an optical cable and/or an optical waveguide, and a second optical port. The optical assembly is installed in an assembled computer and the assembled computer is in a state suitable for an end user. The method includes measuring a second optical power level at the second optical port and determining a quality level by determining if the second optical power level is below a quality threshold value. The transmitting, the measuring, and the determining occur within the assembled computer. An apparatus and computer program product also perform the functions of the method.

In one embodiment, transmitting a first optical power level includes transmitting on a plurality of optical assemblies, measuring a second optical power level includes measuring a plurality of second optical power levels on the plurality of optical assemblies, and determining a quality level includes determining a plurality of quality levels by determining a quality level of each optical assembly. In another embodiment, the plurality of optical assemblies terminates at one or more connection blocks. In another embodiment, determining a plurality of quality levels determines a connection state of a connection block based on a fail pattern of the plurality of quality levels of the optical assemblies terminating at the connection block.

In addition, another apparatus for testing an optical network is disclosed. The apparatus includes a transmission module that transmits a plurality of first optical power levels on a first optical port of a plurality of optical assemblies where each optical assembly includes the first optical port, an optical cable and/or an optical waveguide, and a second optical port. The optical assemblies terminate at one or more connection blocks. The connection blocks are part of one or more optical backplanes. The transmission module is installed in an assembled computer and the assembled computer is in a state suitable for an end user. The apparatus includes a measurement module that measures a plurality of second optical power levels on the second optical ports of the plurality of optical assemblies and a determination module that determines a plurality of quality levels based on the plurality of second optical power levels by determining if each of the plurality of second optical power levels fall below a pre-determined quality threshold range. The apparatus includes a display module that displays a connection quality by displaying the plurality of quality levels and the plurality of quality levels are displayed in an array. The transmission module, the measurement module, the determination module, and the display module function within the assembled computer.

A system for testing an optical network is disclosed. The system includes an optical assembly with a first optical port, an optical cable and/or an optical waveguide, and a second optical port. The system includes an assembled computer that includes the optical assembly. The assembled computer is in a state suitable for an end user. The system includes a transmission module that transmits a first optical power level on the optical assembly, a measurement module that measures a second optical power level on the optical assembly and a determination module that determines a quality level by determining if the second optical power level is below a quality threshold value, the optical assembly. The transmission module, the measurement module, and the determination module function within the assembled computer.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve a stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device, for example.

The computer readable medium may also be a computer readable signal medium. A computer readable signal medium may include a propagated data signal with program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport program code for use by or in connection with an instruction execution system, apparatus, or device. Program code embodied on a computer readable signal medium may be transmitted using any appropriate medium, including but not limited to wire-line, optical fiber, Radio Frequency (RF), or the like, or any suitable combination of the foregoing.

In one embodiment, the computer readable medium may comprise a combination of one or more computer readable storage mediums and one or more computer readable signal mediums. For example, program code may be both propagated as an electro-magnetic signal through a fiber optic cable for execution by a processor and stored on RAM storage device for execution by a processor.

Program code for carrying out operations for aspects of the present disclosure may be generated by any combination of one or more programming language types, including, but not limited to any of the following: machine languages, scripted languages, interpretive languages, compiled languages, concurrent languages, list-based languages, object oriented languages, procedural languages, reflective languages, visual languages, or other, or to be developed language types, for example. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including, but not limited to a local area network (LAN) or a wide area network (WAN), or the connection may be made to an external computer (for example, through the Internet using an Internet Service Provider).

The computer program product may be shared, simultaneously serving multiple customers in a flexible, automated fashion. The computer program product may be standardized, requiring little customization and/or scalable, providing capacity on demand in a pay-as-you-go model.

The computer program product may be stored on a shared file system accessible by one or more servers. The computer program product may be executed via transactions that contain data and server processing requests that use Central Processor Unit (CPU) units on the accessed server. CPU units may be units of time such as minutes, seconds, hours on the central processor of the server. Additionally the accessed server may make requests of other servers that require CPU units. CPU units are an example that represents but one measurement of use. Other measurements of use include but are not limited to network bandwidth, memory usage, storage usage, packet transfers, complete transactions etc.

The computer program product may be integrated into a client, server and network environment by providing for the computer program product to coexist with applications, operating systems and network operating systems software and then installing the computer program product on clients and servers in the environment where the computer program product may function.

In one embodiment software is identified on clients and servers including a network operating system where the computer program product will be deployed that are required by the computer program product or that work in conjunction with the computer program product. This includes a network operating system that is software that enhances a basic operating system by adding networking features.

In one embodiment, software applications and version numbers are identified and compared to the list of software applications and version numbers that have been tested to work with the computer program product. Those software applications that are missing or that do not match the correct version will be upgraded with the correct version numbers. Program instructions that pass parameters from the computer program product to the software applications will be checked to ensure the parameter lists match the parameter lists required by the computer program product. Conversely parameters passed by the software applications to the computer program product will be checked to ensure the parameters match the parameters required by the computer program product. The client and server operating systems including the network operating systems will be identified and compared to the list of operating systems, version numbers and network software that have been tested to work with the computer program product. Those operating systems, version numbers and network software that do not match the list of tested operating systems and version numbers will be upgraded on the clients and servers to the required level.

In response to determining that the software where the computer program product is to be deployed, is at the correct version level that has been tested to work with the computer program product, the integration is completed by installing the computer program product on the clients and servers.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by program code. The program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in another order, depending upon the functionality involved. Other steps and methods may be conceived that are equivalent in function, logic, or effect to one or more blocks, or portions thereof, of the illustrated figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Testing an Optical Network

High performance computers, or super computers, often contain optical networks to communicate between processor nodes in the computer assembly. It is desirous to quickly manufacture such computers with high reliability. Therefore, it is desirable that optical networks are efficiently tested and verified before such a computer assembly may be delivered to an end user. Optical networks may be very complicated and may require a concise and automated testing procedure. Optical networks may require precise component alignment and clean interfaces to maximize performance. Testing an optical network digitally may not reveal imperfections in mechanical state, component alignment, or cleanliness. Components may pass a digital test although interfaces may be dirty or misaligned. In such scenarios, an optical network may prematurely fail, as compared to an optical network with superior component alignment and cleanliness.

Testing an optical network using analog power levels may more easily discover component alignment imperfections, dirty connections, or other conditions that may negatively impact communications on the optical network. Transmitting an analog optical power level on a component assembly, and then measuring small variations in a received optical power level may indicate undesirable conditions that may not be detected using a digital testing method.

Additionally, such a testing apparatus or method may display results of an analog testing method. Because an optical network may be very complex and may comprise hundreds, or thousands, or more optical assemblies, an efficient display method may facilitate a testing operator quickly determining subtle deficiencies of a plurality of the optical assemblies of the optical network. The following embodiments disclose various testing apparatus and testing methods.

Figure 1:
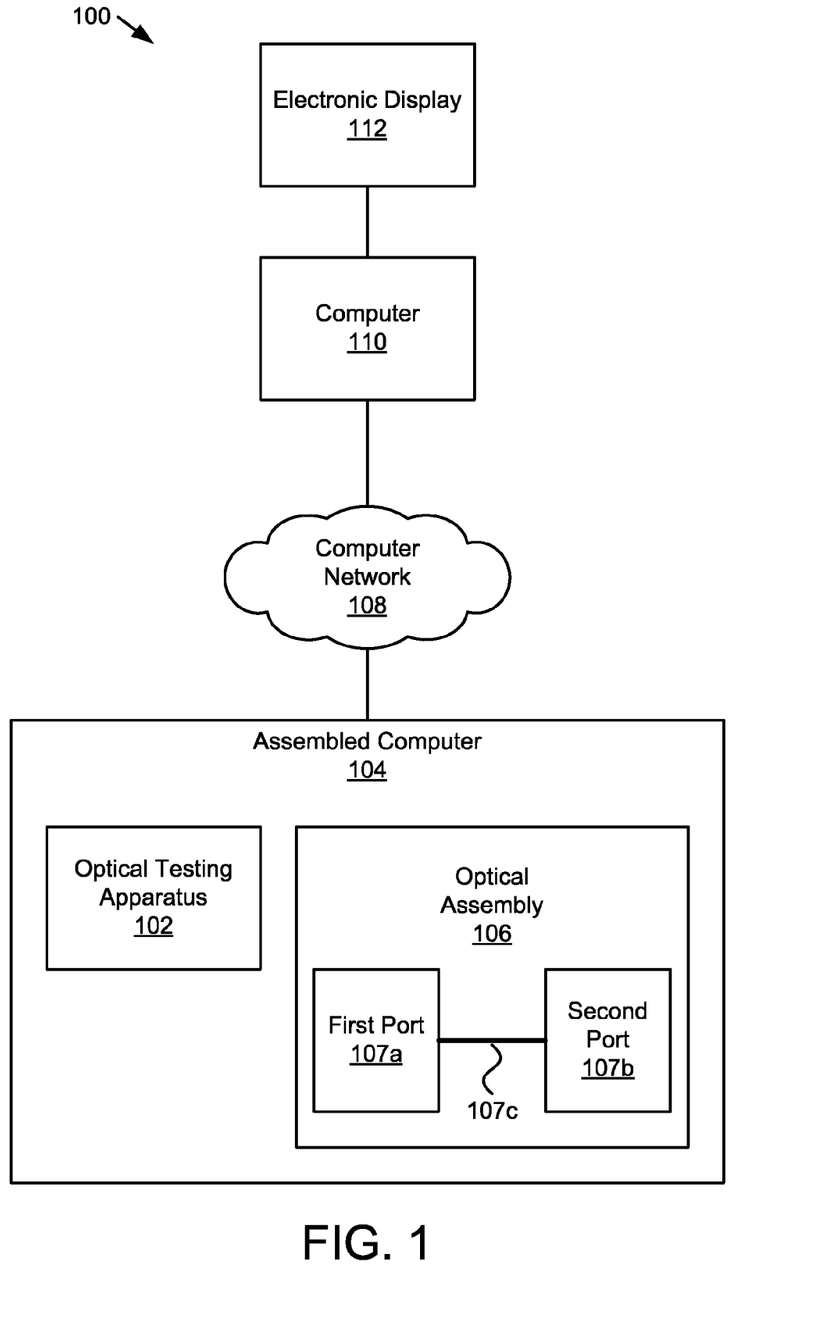
FIG. 1 is a schematic block diagram illustrating one embodiment of a system for testing an optical network in accordance with the present disclosure.

FIG. 1 depicts one embodiment of a system 100 for testing an optical network. The system 100 may include an optical testing apparatus 102, and an optical assembly 106 in an assembled computer 104. In the depicted embodiment, the assembled computer 104 may communicate with an Electronic Display 110 via a computer network 108.

The optical testing apparatus 102, tests one or more optical assemblies 106 and will be discussed in more detail with regard to the apparatus 200 of FIG. 2. The assembled computer 104 may be a server, a workstation, a super computer, a desktop computer, a laptop computer, a tablet, a special purpose computer, or any other computer that includes optical cables and/or an optical waveguides. In one embodiment, the assembled computer 104 is a standalone computer. In another embodiment, the assembled computer 104 is part of another device or assembly.

In one embodiment, the assembled computer 104 is in a state suitable for an end user. For example, the assembled computer 104 may be ready for shipment to a customer. The assembled computer 104 is configured with the optical testing apparatus 104, in one embodiment, such that the assembled computer 104 may be tested without disconnecting the optical assembly 106. In various prior art systems, optical assemblies are tested individually or are part of a larger assembly and are disconnected prior to testing or are disconnected specifically for testing. Other prior art optical testing systems test optical assemblies merely by sending specific digital patterns and verifying that that digital pattern is receive at the other end. The optical testing apparatus 102, in one embodiment, advantageously uses an analog signal for optical testing while the optical assembly 106 is in a final, assembled state. In one example, the assembled computer 104 with one or more optical assemblies 106 may be called a complete system.

In one embodiment, the optical assembly 106 includes a first optical port 107a, and a second optical port 107b, and an optical cable and/or an optical waveguide 107c. The optical ports 107a-107b, in one example, are connected to a first and a second end of an optical cable or optical waveguide 107c, such that optical signals transmitted via first optical port 107a may be received via second optical port 107b. In another embodiment, optical signals may be transmitted via the second optical port 107b may be received via the first optical port 107a. In another embodiment, the optical assembly 106 is bidirectional such that the first and second ports 107a-107b may each send and receive.

In one embodiment, two or more optical assemblies 106 terminate at a connection block such that first and/or second ports 107a-107b are part of the connection block. For example, several first ports 107a may be part of a first connection block and several second ports 107b may be part of a second connection block. In another example, two or more connection blocks are part of an optical backplane. In one embodiment, two optical assemblies 106 that terminate on a particular optical backplane at one end of the optical assemblies 106 may terminate on two separate optical backplanes on the other end of the optical assemblies 106. A connection block or multiple connection blocks, in one embodiment, connect to a processor node the assembled computer 104. In another embodiment, one or more connection blocks plug into another device within the assembled computer 104. One of skill in the art will recognize other configurations of optical assemblies 106 within connection blocks and optical backplanes.

A first port 107a of a particular optical assembly 106 may be designated as a receive port or a transmit port, depending on configuration of the optical assembly 106. Likewise, the second port 107b of an optical assembly 106 may be either a receive port or a transmit port. In an alternate embodiment, an optical assembly 106 is bidirectional such that data may be sent or received at either the first port 107a or the second port 107b. For a particular connection block, in one example, one optical assembly 106 terminating at the connection block may be designated for transmitting data while another optical assembly 106 may be designated for receiving data. Testing methods may be different for transmitting and receiving optical assemblies 106.

The system 100 includes, in one embodiment, a computer network 108. The computer network 108, in one example, connects to a computer 110, which may also be connected to an electronic display 112. The computer may be used for testing, for receiving test data, for analyzing test data, etc. In another embodiment, the computer network 108 is connected directly to the electronic display 112. The computer network 108 may be a local area network ("LAN"), a wireless network, an optical network, the internet, a combination of networks, or other network known to those of skill in the art. The computer network 108 may include cables, routers, switches, servers, or other networking equipment. One of skill in the art will recognize other computer network equipment.

The computer 110 may be a desktop computer, a laptop computer, a workstation, a tablet, or other computing device. In one embodiment, the assembled computer 104 does not connect to a computer 110 and the assembled computer 104 performs optical testing internally. The assembled computer 104, in one embodiment, connects directly to the electronic display 112 for monitoring optical testing, displaying results, etc. In another embodiment the assembled computer 104 stores test data for later analysis or sends test data to the computer 110 or other device.

Figure 2:
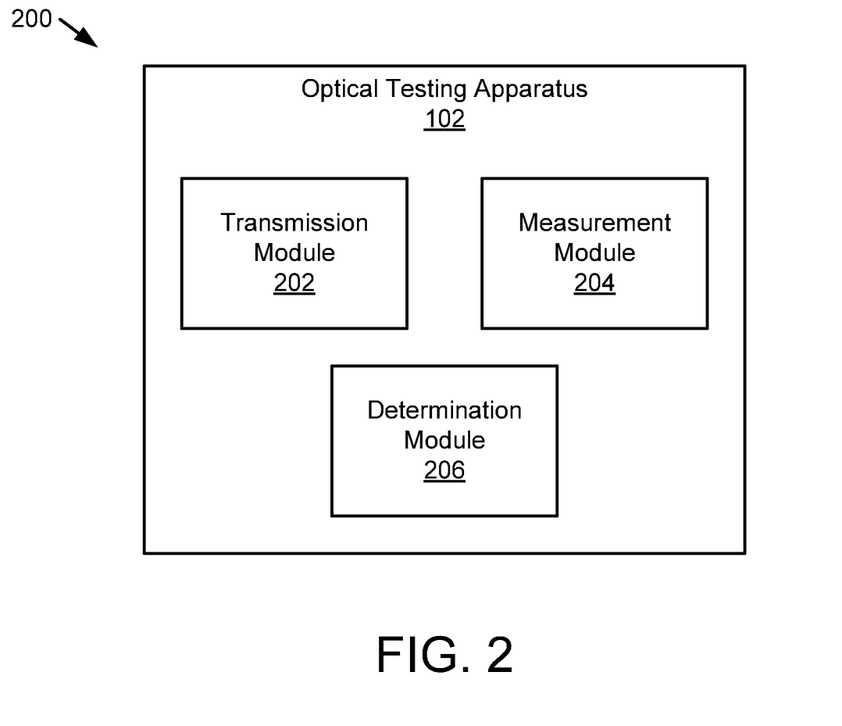
FIG. 2 is a schematic block diagram illustrating one embodiment of an apparatus for testing an optical network in accordance with the present disclosure.

FIG. 2 is a schematic block diagram illustrating one embodiment of an apparatus 200 for testing an optical network in accordance with the present disclosure. The apparatus 200 includes an optical testing apparatus 102 with a transmission module 202, a measurement module 204, and a determination module 206, which are described below.

The apparatus 200 includes a transmission module 202 that transmits a first optical power level on a first optical port 107a of an optical assembly 106. As described above in relation to the system 100 of FIG. 1, the optical assembly 106 includes the first optical port 107a, an optical cable and/or an optical waveguide 107c, and a second optical port 107b and the optical assembly 106 is installed in an assembled computer 104. The assembled computer 104 is in a state suitable for an end user.

In one embodiment, the transmission module 202 may transmit over a processor node or other hardware, circuits, etc. that enable transmission of optical power levels from one optical port to another of the optical assembly 106. An optical power level may include a specific intensity or magnitude of a light based signal. The first optical power level may be a particular intensity or magnitude of light.

In one embodiment, the transmission module 202 transmits a first optical power level over a plurality of optical assemblies 106. For example, the transmission module 202 may transmit a first power level over multiple optical power assemblies 202 terminating on one or more connection blocks. In another embodiment, the transmission module 202 may transmit a first power level over multiple optical power assemblies 202 of an optical backplane. In addition to the transmission module 202 transmitting a first optical power level, the optical assemblies 106 installed in the assembled computer 104 are positioned for transmission of data.

The optical testing apparatus 102 includes a measurement module 204 that measures a second optical power level at the second optical port 107b on the optical assembly 106. In one embodiment, when the transmission module 202 transmits the first optical power level on a plurality of optical assemblies 106, the measurement module 204 may receive a second optical power level on multiple second optical ports 107b of the optical assemblies 106. In another embodiment, where the transmission module 202 transmits the first optical power level on a connection block, optical backplanes, etc., the measurement module 204 may measure a second optical power level on corresponding connection blocks, optical backplanes, etc.

In one embodiment, the measurement module 204 measures one or more second optical power levels as analog measurements. Measuring the second optical power levels as analog measurements is advantageous because an analog measurement can determine an amount of optical power on a continuous scale. In the prior art where a digital pattern is sent and received, the received digital pattern may be at a signal strength that is just above some level where the digital pattern could be read. Thus sending and receiving a digital pattern may be barely functioning on one optical assembly 106 while the digital pattern may have a strong signal on another optical assembly 106 and both received digital signals may pass a qualification test. An analog measurement may be able to discern that one optical power level is higher than another to make a finer distinction of quality of the received optical power levels.

In another embodiment, the optical testing apparatus 102 includes a determination module 206 that determines a quality level by determining if the second optical power level is below a quality threshold value. The determination module 206 may determine the quality level based, at least in part, on a measured second optical power level of an optical assembly 106. In one embodiment, the measurement module 204 or determination module 206 may digitize the second optical power level.

In one embodiment, the transmission module 202 may transmit a first optical power level on the second optical port 107b of the optical assembly 106 and the measurement module 204 may measure a second optical power assembly on the first optical port 107a. For example, the transmission module 202 may transmit the first optical power level on the first optical port 107a and also on the second optical port 107b.

Ports of the optical assembly 106 may be designated as either transmit or receive ports during operation of the optical testing apparatus 102. The determination module 206 may determine if the second optical power level is below a quality threshold value. If second optical power level falls below a quality threshold value, the determination module 206 may determine that the quality level is poor. Alternatively if second optical power level is above a quality threshold value, the determination module 206 may determine that the quality level is acceptable. The determination module 206 may describe several different quality levels including, but not limited to the following: nothing, poor, bad, low, acceptable, adequate, medium, good, high, very good, excellent, perfect, or other, for example. In another embodiment, the determination module 206 may determine a quality level according to a numerical value. Numerical value may represent units, or may be a scalar.

Quality threshold values may differ between transmit ports and receive ports. For example, a quality threshold level of "excellent" may be a minimum of 1056 microwatts for a transmit port, but may be 880 microwatts for a receive port. A quality threshold level of "very good" may be a minimum of 720 microwatts for a transmit port, but may be 600 microwatts for a receive port. A quality threshold level of "good" may be 396 microwatts for a transmit port, but may be 330 microwatts for a receive port. A quality threshold level of "marginal" may be 162 microwatts for a transmit port, but may be 135 microwatts for a receive port. Measured second optical power levels that fall below 162 microwatts for a transmit port may not meet any threshold level. In one embodiment, measured second optical power levels that fall below 135 microwatts for a receive port may not meet any threshold level.

Of course, one skilled in the art will recognize that other quality threshold levels may be possible, depending on the nature of the optical assembly being tested, or the intensity or magnitude or the originally transmitted optical power level. For example, threshold levels may be percentages of the first transmitted power level or other. Also, quality threshold levels may change over time due to a variety of factors, including, but not limited to, enhanced technology, cleaner testing environments, more precise manufacturing, or other for example.

The transmission module 202 may transmit a first optical power level on each of the more than one optical assemblies 106 and the measurement module 204 may measure an optical power level on each of the plurality of optical assemblies 106. The determination module 206 may then determine a plurality of quality levels based, at least in part, on the plurality of measured optical power levels measured on the plurality of optical assemblies. In one embodiment, the plurality of optical assemblies 106 include some that are designated for transmission of data and others are designated for receiving data. The determination module 206, in one embodiment, determines a quality level for the transmission and receiver optical assemblies 106 and matches various quality threshold values with the different types of optical assemblies 106.

Figure 3:
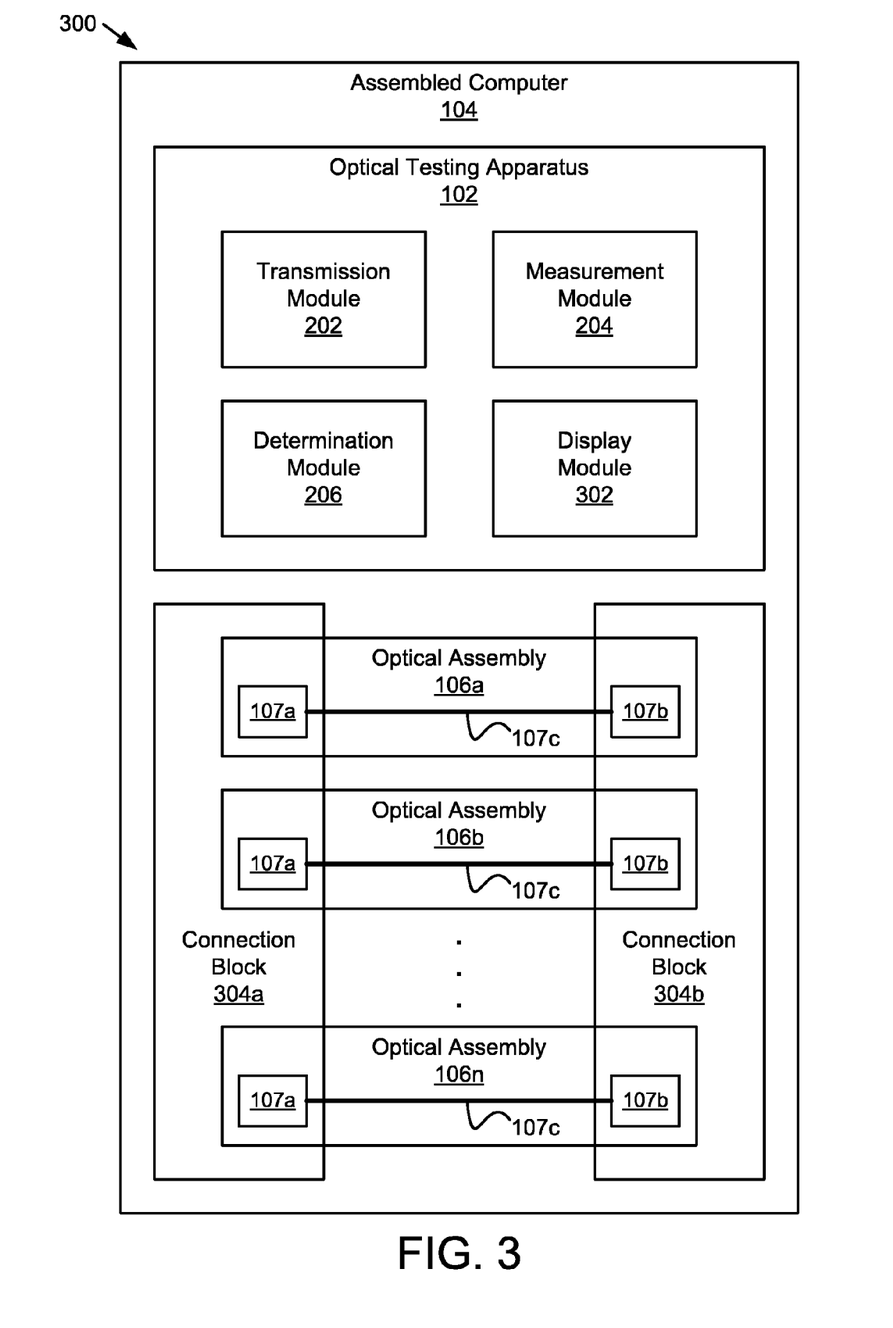
FIG. 3 is a schematic block diagram illustrating an assembled computer including one embodiment of an apparatus for testing an optical network in accordance with the present disclosure.

FIG. 3 is a schematic block diagram illustrating an assembled computer 104 including one embodiment of an apparatus 300 for testing an optical network in accordance with the present disclosure. The apparatus includes a transmission module 202, a measurement module 204, and a determination module 206 which are substantially similar to those described above in relation to the apparatus 200 of FIG. 2. The apparatus 300 also includes a display module 302 that displays the measured second optical power level, or a determined quality level, or other, for example. The assembled computer 104 also depicts a plurality of optical power assemblies 106a-106n terminating at connection blocks 304a, 304b.

In one embodiment, the display module 302 may display a plurality of quality levels, for example, in an array. In one embodiment, respective quality levels may be displayed as elements of the array. Digitized secondary optical power level may be used in the array. The array may be based on a text output, or may be based on a graphical output, such as a bitmap, or the like. Where the display module 302 implements a text based output, the output may include one character for each of the plurality of optical assemblies 106. Displayed character may represent various predefined threshold levels, a pass/fail result, or other for example. Where the display module 302 implements a graphical output, output may include a block of pixels or other graphical shape for each of the determined quality levels. The graphical output may include a chart where each second optical power level is a line or other shape on the chart. Also, the display module 302 may implement any number of colors to help facilitate an adequate presentation of the plurality of determined quality levels. Of course, one skilled in the art will recognize that a wide variety of text based outputs or graphical outputs may be generated that adequately display the plurality of determined quality levels.

Where the display module 302 displays the quality levels in an array, the array may be divided to represent various groupings of optical assemblies 106a-106n. For example, a grouping of optical assemblies may represent a connection block (e.g. 304a), a group of connection blocks, etc. An array or portion of an array may also represent an optical backplane. The array may have divisions and subdivisions. The display module 302 may also display an array of second optical power levels along with other information, such as identifiers for connection blocks 304a, 304b, optical assemblies 106a-106n, location information, etc. One of skill in the art will recognize other ways that the display module 302 may display second optical power levels.

Figure 4:
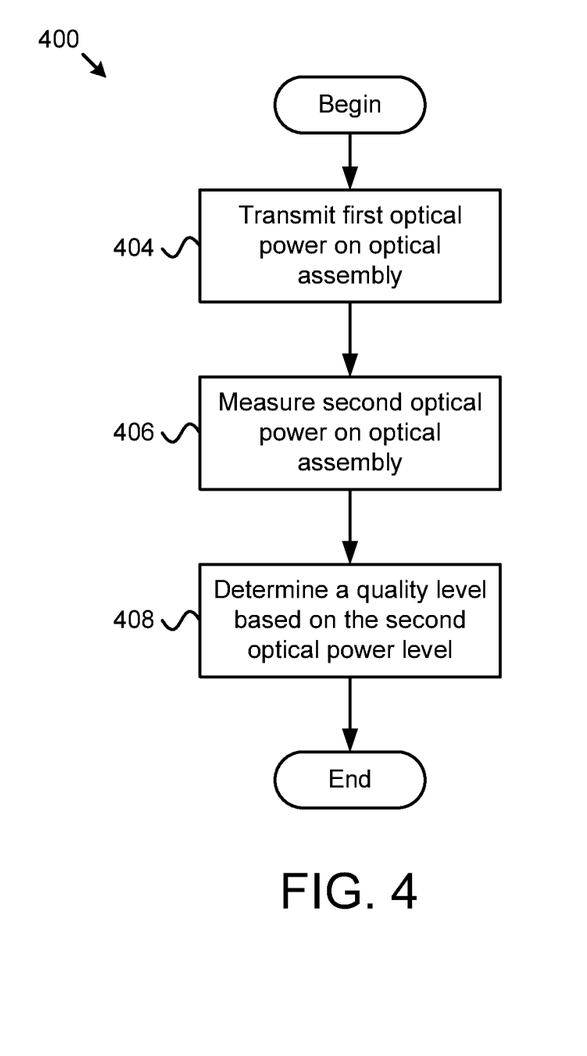
FIG. 4 is a schematic flow chart diagram illustrating one embodiment of a method for testing an optical assembly in accordance with the present disclosure.

FIG. 4 depicts one embodiment of a method 400 for testing an optical network. The method 400 begins and transmits 404 a first optical power on an optical assembly 106. The optical assembly 106, in this embodiment, may include a first optical port 107a, an optical cable and/or an optical waveguide, and a second optical port 107b as previously discussed. Also, the optical assembly 106 may be installed in an assembled computer 104. The assembled computer 104 may be in a state suitable for an end user, and may not require additional hardware and/or software modifications for the assembled computer 104 to perform a function for a consumer. In one embodiment, the transmission module 202 transmits 404 a first optical power level.

The method 400 measures 406 a second optical power level on the optical assembly 106. The second optical power may be measured via a first optical port 107a, or a second optical port 107b of an optical assembly as previously discussed. The measurement module 204, in one embodiment, measures 406 the second optical power level. The method 400 determines 408 a quality level based on the second power level 408, and the method 400 ends. In one embodiment, the determination module 206 determines 408 the quality level. If the second optical power level is below a quality threshold value, then the quality level may be determined to not have met a desired quality level.

Figure 5:
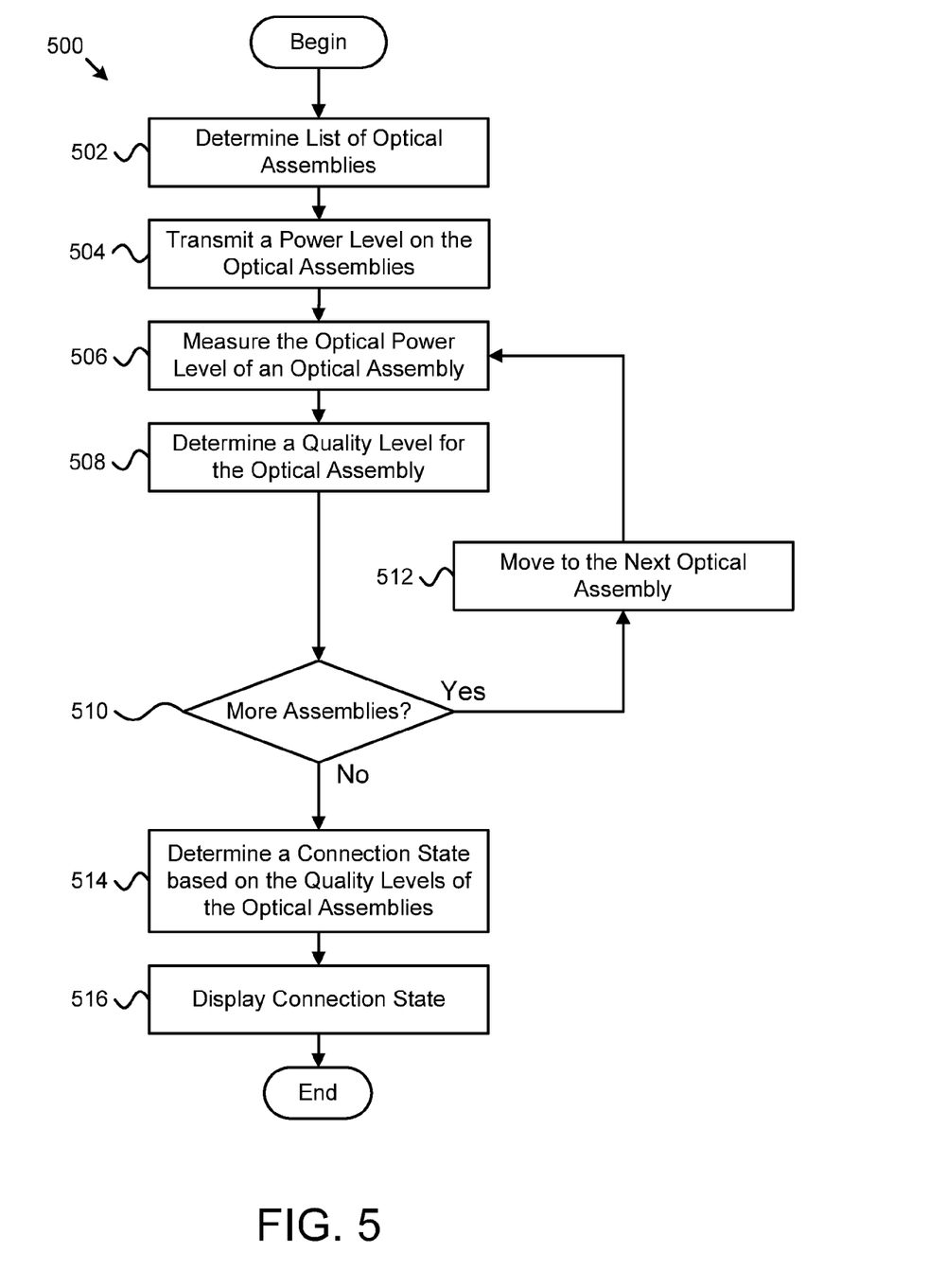
FIG. 5 is a schematic flow chart diagram illustrating another embodiment of a method for testing an optical network in accordance with the present disclosure.

FIG. 5 is a schematic flow chart diagram illustrating another embodiment of a method 500 for testing an optical network in accordance with the present disclosure. The method 500 begins and determines 502 a list of optical assemblies 106 and transmits 504 a first optical power level on the optical assemblies 106. In one embodiment, the method 500 measures 506 a second optical power level on one of the plurality of optical assemblies. The method 500 determines 508 a quality level of the optical assembly 106. The quality level determines 508 the quality level based, at least in part, on the measured power level of the optical assembly 106. The method 500 then determines 510 if there are more optical assemblies 106 to measure. If the method 500 determines 510 that there are more optical assemblies 106 to measure, the method 500 moves 512 to the next one of the plurality of optical assemblies 106.

If the method 500 determines 510 that there are no more optical assemblies to measure, the method 500 determines 514 a connection state based, at least in part, on the plurality of determined quality levels. The connection state may be pass or fail, or other for example. The connection state may indicate failure in any number of states, including, but not limited to, mechanical damage, connector damage, bad port, bad connector, dirty, or may suggest a reattachment of the connector (also known as a "replug"), or other for example. The method 500 displays 516 the connection state, and the method 500 ends. The connection state may be displayed via a text based output, or a graphical output as one skilled in the art will appreciate.

Figure 6:
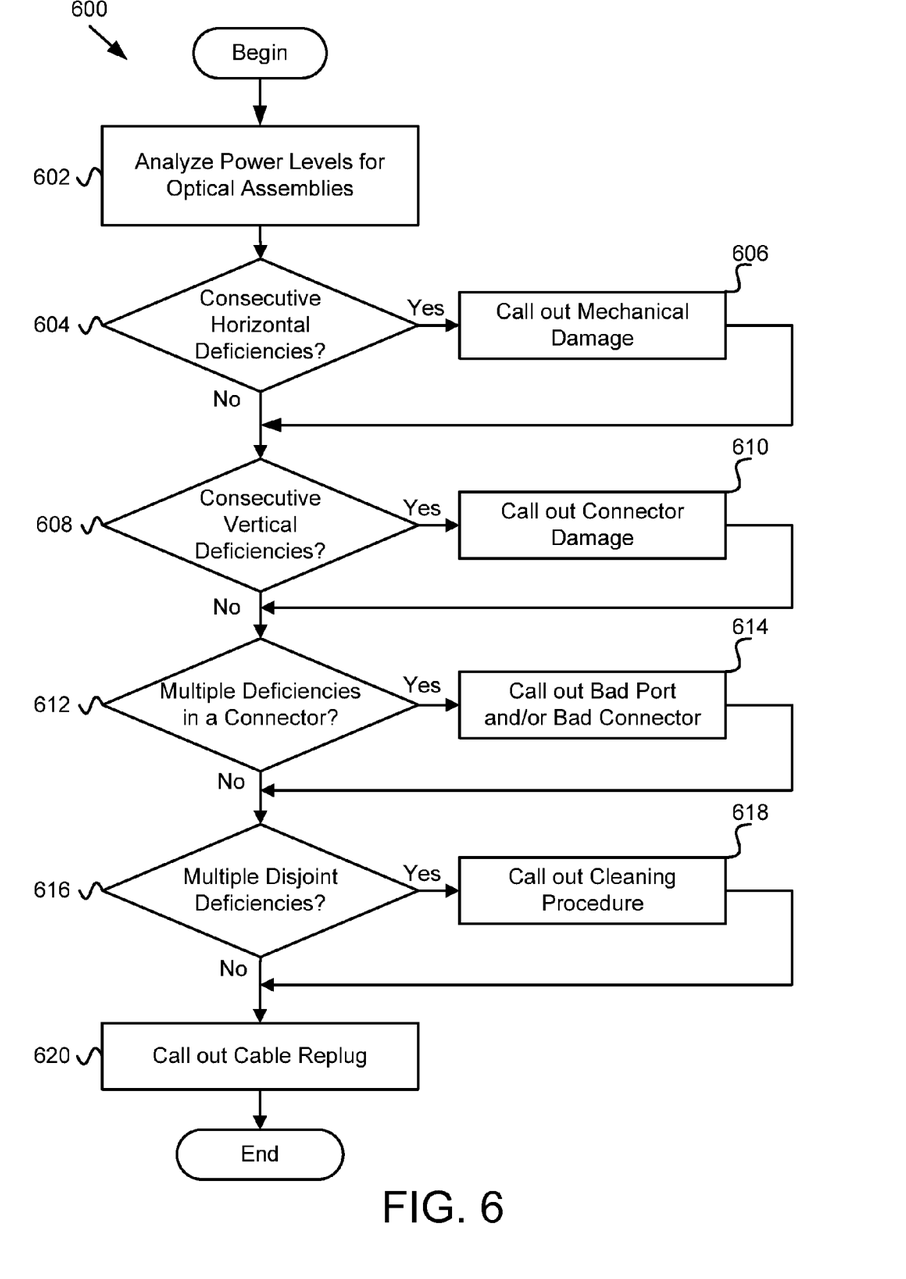
FIG. 6 is a schematic flow chart diagram illustrating yet another embodiment of a method for correcting a connection state of an optical network in accordance with the present disclosure.

FIG. 6 depicts one embodiment of a method 600 for processing error data based on a test of an optical network. According to this embodiment, the determination module 206 determines a plurality of second optical power levels based on a plurality of optical assemblies 106a-106n as previously discussed. According to this embodiment, the plurality of optical assemblies 106a-106n connects to a connection block (e.g. 304a) with vertical columns and horizontal rows. In another embodiment, the plurality of optical assemblies 106a-106n connect to multiple connection blocks at an end where the measurement module 204 measures the second optical power level and the determination module 206 determines a quality level for the optical assemblies 106a-106n terminated at the multiple connection blocks.

The method 600 analyzes 602 the measured power levels of the plurality of optical assemblies 106a-106n and determines if a measured second optical power levels of any of the optical assemblies 106a-106n falls below a pre-defined quality threshold. This particular method 600 is applicable to a situation where the determination module 206 determines that one or more optical assemblies 106a-106n are below a quality threshold value and the method 600 is useful to determine specific action to take as a result. The display module 302 may display the second optical power levels for analysis. For example, the display module 302 may display the second optical power levels in an array and each measured second optical power level may be displayed with a particular character, symbol, color, etc. corresponding to a particular quality threshold applicable to the measured optical assembly (e.g. 106a) and may depend on whether the optical assembly 106a is for transmission or reception of data. Additionally, the method 600 may compare measured second optical power levels of a plurality of optical assemblies 106a-106n with pre-defined fail patterns for a connection block 304a, for a group of connection blocks, for an optical backplane, etc.

The method 600 determines 604 if a pattern of failed optical assemblies 106 within a connection block (e.g. 304a) includes consecutive horizontal deficiencies in the connection block 304a. If the method 600 determines 604 that there is a pattern of failed optical assemblies 106 in a horizontal row, the method may call out 606 mechanical damage, for example, to the rear of a processor node. For example, the horizontal row of failed optical assemblies 106 may span multiple connectors so that a horizontal row of failed optical assemblies 106 may be indicative of damage to the rear of the processor node that causes a horizontal row of optical ports to not be properly seated. The method 600 may return to determine 608 if there are consecutive vertical deficiencies in the connection block 304a. If the method 600 determines 604 that there is not a pattern of failed optical assemblies 106a-106n, the method 600 may also determine 608 if there are consecutive vertical deficiencies in the connection block 304a.

If the method 600 determines 608 that there is a vertical fail pattern of optical assemblies 106, for example within a connection block 304a, the method 600 may call out connector damage 610. A vertical fail pattern may be indicative of connector block damage rather than mechanical damage to the back of a processor node. For both cases where the method determines 608 that there is a vertical fail pattern or not, the method 600 moves on to determine 612 if there is a fail pattern with multiple deficiencies within a single connection block 304, for example multiple deficiencies that may be scattered or maybe not in a particular horizontal or vertical pattern discussed above. If the method 600 determines 612 that there are multiple deficiencies within a connection block 304, the method 600 may call out 614 a bad connection block 304. Note that the method 600 may also determine 612 that multiple connection blocks 304 include multiple deficiencies and may call out 614 a bad connection block 304 for each of the connection blocks 304 with deficiencies.

For both cases where the method determines 612 that there are multiple deficiencies within a connection block 304 or not, the method 600 moves on to determine 616 if a fail pattern includes multiple disjoint deficiencies (i.e. deficiencies that may not be associated with a specific contiguous set of optical assemblies 106). If the method 600 determines that there are multiple disjoint deficiencies, the method 600 may call 618 out a cleaning procedure 618 for an entire connection block 304, group of connection blocks, etc. that are being tested and displayed. For example, multiple disjoint deficiencies may be indicative of dust particles or dirt interfering with a connection of the group of optical assemblies 106 being tested. Otherwise, if the method 600 determines that the error condition does not match any of a set of pre-defined fail patterns or conditions, the method 600 may call out 620 a cable re-plug, and the method 600 ends.

The method 600 is merely one particular set of potential diagnoses of a few potential problems based on a few identified patterns. Other patterns may also be analyzed which may include other corrective procedures. In one embodiment, when the corrective procedures called out by the method 600 are completed, the methods 400, 500 may be repeated and if optical assemblies are determined to be deficient, the method 600 of FIG. 6 may be repeated. Note that where several quality values are set for a particular group of optical assemblies 106 under test, patterns may indicate a problem to be corrected even where the individual levels may be above an acceptable quality level. For example, where the method 600 determines 604 that there is a row of horizontal deficiencies, some of the measured second optical power levels in the horizontal pattern may be higher than others and some may be above a minimum acceptable quality level value, but may be below a higher determined quality level associated with surrounding optical assemblies 106 so that one of skill in the art may determine that the pattern requires corrective action. By taking analog measurements of optical power levels, the embodiments described above may allow identification of connection problems of optical assemblies 106 that might not otherwise be detected with currently available testing techniques. One skilled in the art will recognize that many other patterns may be used to indicate a variety of different fail conditions based, at least in part, but not limited to, hardware configuration, software configuration, connection block configurations, testing environment, or other, for example.

Figure 7:
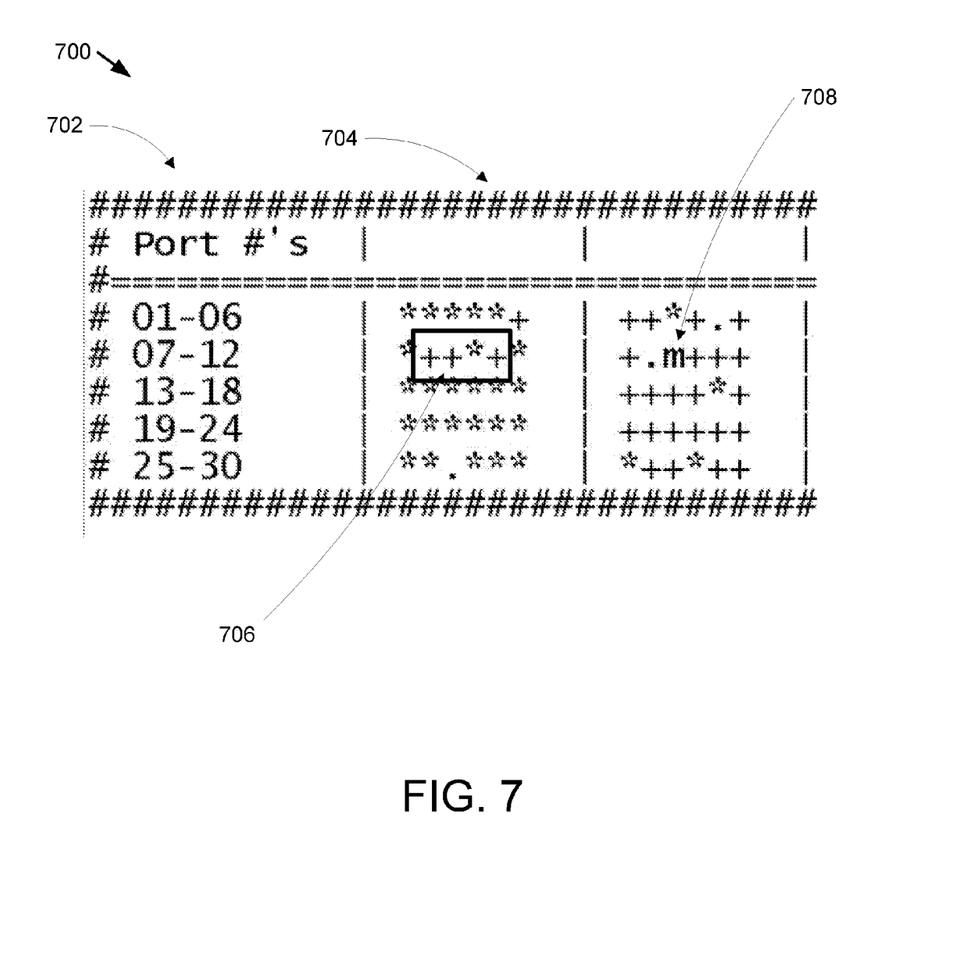
FIG. 7 is an image illustrating one embodiment of text display in accordance with the present disclosure.

FIG. 7 depicts an embodiment of a text-based display 700 in accordance with the present disclosure. The display 700 may be generated by the display module 302, or other display means for example, and may depict a plurality of quality levels based, at least in part, on a plurality of measured second optical power levels as previously discussed. The display 700 may output text characters for respective optical assemblies 106, wherein different characters may represent different determined quality levels. For example, an "*" may represent an "excellent" quality level, a "+" may represent a "very good" quality level, a "." may represent a "good" quality level, an "m" may represent a "high marginal" quality level, an "x" may represent a "low marginal" quality level, and an "X" may represent a "bad" quality level. Of course, one skilled in the art will recognize that the indicated representative characters are only one example of what may be used to represent a set of quality levels. Additionally, many more, or less, discrete quality levels may be specified with associated characters for representation.

The display 700 may output multiple columns, the first of which may be a column 702 identifying optical ports associated with a set of the plurality of determined quality levels. The display 700 may output a second column 704 that may output a set of characters that may represent quality levels of respective optical ports of optical assemblies being tested, as previously discussed. The display 700 may also indicate optical ports, or optical assemblies 106 that may require attention. For example, the display 700 may indicate a series of horizontal optical ports that did not meet a pre-defined threshold level, such as, an "excellent" threshold as previously indicated. In this embodiment, several horizontal optical ports 706 only meet the "very good" threshold, which may suggest to an operator of the optical testing apparatus 102 that mechanical damage may be present in the connection blocks 304 for the associated optical ports. Also, the display 700 may indicate 708 a single optical port, or optical assembly 106 that fails to meet a pre-defined threshold, such as "high marginal" for example. Disclosure is not limited in this regard. For example, the display 700 may indicate single ports, series of ports, single optical assemblies, single connectors, or an entire optical backplane with a single character. Also, the display 700 may indicate a quality level for each of a plurality of optical assemblies as previously indicated. One skilled in the art will appreciate a wide variety of possibilities regarding characters, representations, sets of characters, or other representations according to an optical testing apparatus as disclosed herein, according to available display technology, or other, for example.

Figure 8:
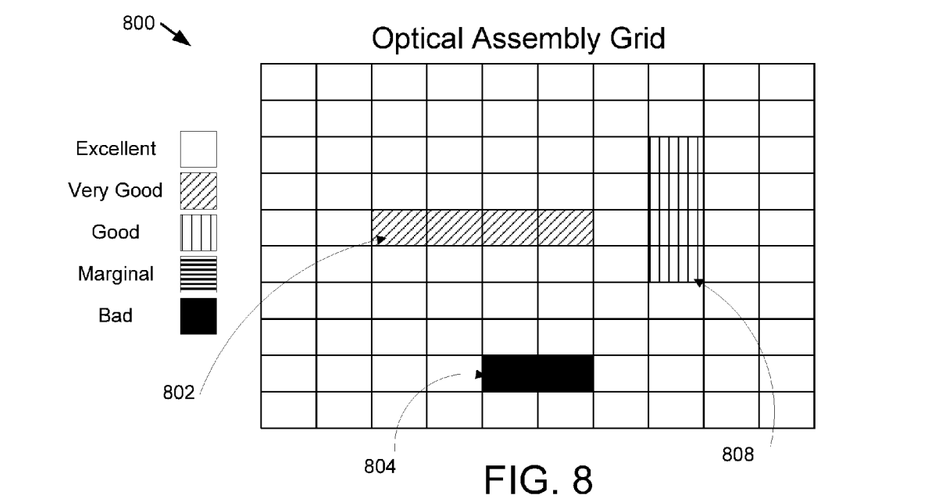
FIG. 8 is an image illustrating one embodiment of a graphical display displaying connection qualities of optical assemblies in accordance with the present disclosure.

FIG. 8 is an image illustrating one embodiment of a graphical display 800 displaying connection qualities of optical assemblies 106 in accordance with the present disclosure. The display 800 may indicate a set of optical assemblies that require attention graphically. Referring to FIG. 8, a portion of a horizontal row 802 may be represented by a graphical block containing diagonal lines for those optical assemblies that only exceed a "very good" pre-determined threshold level. Also, a portion of a vertical column 808 may be represented by a graphical block containing vertical bars for those optical assemblies that only exceed a "good" threshold. Additionally, individual optical assemblies that only exceed a "bad" threshold 804 may be represented via a filled in block. The display 800 is also not limited in this regard. Display may indicate various quality levels of optical assemblies via other patterns, colors, dynamic representations such as blinking, flashing, dimming, rotating, brightening, or other, for example, as one skilled in the art will appreciate.

Figure 9:
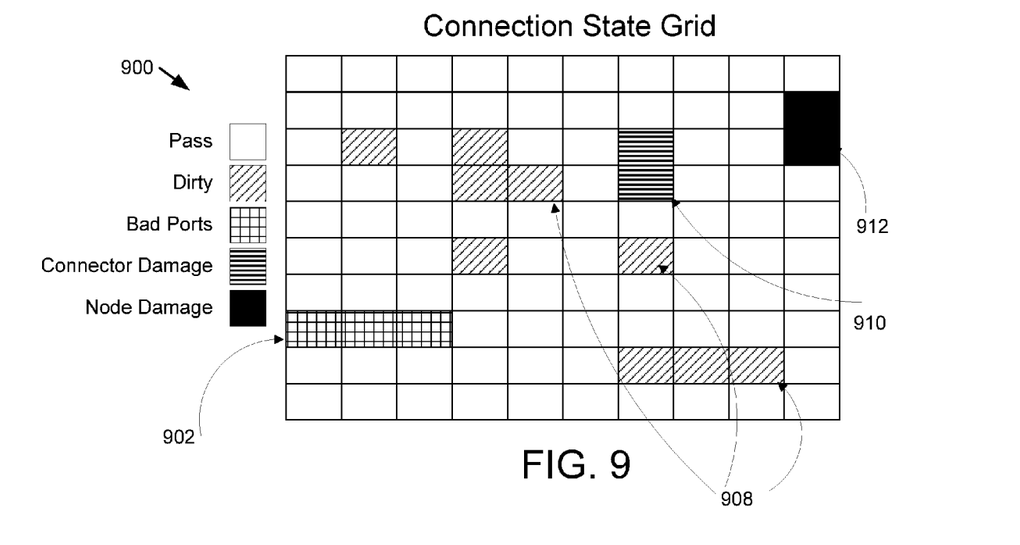
FIG. 9 is an image illustrating one embodiment of a graphical display displaying a grid of connection states in accordance with the present disclosure.

FIG. 9 is an image illustrating one embodiment of a graphical display 900 displaying a grid of connection states in accordance with the present disclosure. Referring to FIG. 9, instead of a display indicating quality levels of optical assemblies, a display 900, may indicate connection states for a set or array of connection blocks 304. Each element in the displayed array may represent a connection block connecting a plurality of optical assemblies. In this manner, a connection state for optical assemblies 106 associated with one connector may be represented. Connection states may be determined based at least in part, on the method 600 depicted in FIG. 6. For example, in this embodiment, a group of connectors 902 may be indicated to contain bad optical ports if there are multiple optical assemblies 106 that fail to meet a predefined threshold, but that the failures do not indicate any specific pattern of failure. Another group of connectors 908 may be indicated to be dirty. Another group of connectors 910 may indicate connector damage. Another group of connectors 912 may indicate node damage, or damage to the optical assembly as previously discussed.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
transmitting an optical signal at a first optical power level on a first optical port of an optical assembly, the optical assembly comprising the first optical port, a second optical port, and one or more of an optical cable and an optical waveguide connecting the first optical port to the second optical port, the optical assembly installed in an assembled computer, the assembled computer in a state suitable for an end user;
measuring a received optical power level of the optical signal received at the second optical port; and
determining a quality level for the optical assembly by determining if the received optical power level is below a quality threshold value,
the transmitting, the measuring, and the determining occurring within the assembled computer.

2. The method of claim 1, wherein transmitting an optical signal at a first optical power level further comprises transmitting a plurality of optical signals on a plurality of optical assemblies, measuring a second optical power level further comprises measuring a plurality of received optical power levels on the plurality of optical assemblies, and determining a quality level further comprises determining a plurality of quality levels for the plurality of optical assemblies by determining a quality level of each optical assembly.

3. The method of claim 2, wherein the plurality of optical assemblies terminates at one or more connection blocks.

4. The method of claim 3, wherein, determining a plurality of quality levels determines a connection state of a connection block based on a fail pattern of the plurality of quality levels of the optical assemblies terminating at the connection block.

5. The method of claim 2, wherein determining the plurality of quality levels is based on one or more pre-determined threshold ranges, each pre-determined threshold range comprising a quality threshold value.

6. The method of claim 2, further comprising displaying the plurality of quality levels.

7. The method of claim 6, wherein displaying the plurality of quality levels further comprises displaying the plurality of quality levels in an array, respective quality levels being displayed in an element of the array.

8. The method of claim 7, wherein each element of the array comprises a quality level of a plurality of possible quality levels.

9. The method of claim 6, wherein displaying the plurality of quality levels further comprises displaying the plurality of quality levels in a bitmap.

10. The method of claim 6, wherein displaying the plurality of quality levels further comprises displaying the plurality of quality levels for a plurality of connection blocks, each connection block comprising a plurality of optical assemblies terminating at the connection block.

11. The method of claim 2, wherein the plurality of optical assembles comprises an optical backplane.

12. The method of claim 11, wherein the assembled computer comprises a plurality of optical backplanes.

13. The method of claim 1, wherein measuring the second received optical power level at the second optical port comprises an analog measurement.

* * * * *